United States Patent Office 3,436,602
Patented Apr. 1, 1969

3,436,602
ELECTRIC WIRING DEVICE COMPRISING AUTOMATIC SWITCH AND SOCKET
Ermanno Bassani, Corso di Porta Vittoria 9, Milan, Italy
Filed Apr. 11, 1967, Ser. No. 630,037
Claims priority, application Italy, Apr. 12, 1966, 2,339/66
Int. Cl. H02b 1/04, 7/00
U.S. Cl. 317—99                                          6 Claims

ABSTRACT OF THE DISCLOSURE

A wiring device includes an outer housing having a first open side and an inner housing received in the outer housing and having a second open side facing in the same direction as the first open side. A cover plate overlies both of the open sides and is connected with both of the housings. The cover plate has a first aperture and spaced therefrom a plurality of second apertures all of which communicate with the interior of the inner housing. A multisection circuit breaker is mounted in the inner housing arranged to be connected to a source of electric energy and comprises actuating portions each of which controls one of the independently acting sections of the circuit breaker. The actuating portions are accessible through the first aperture. A plurality of electrical outlet devices are arranged in the inner housing electrically connected with the respective sections of the circuit breaker so that each outlet device is controlled by one of these sections; the outlet devices are each accessible through one of the second apertures.

---

This invention relates to an electric wiring device, wherein an automatic switch, particularly of the magneto-thermical-differential type, together with one or more sockets directly fed by said switch, is enclosed.

The main object of this invention is to provide a wiring device providing full and selective protection of the successively stepped appliances or the like using the electric current fed through said wiring device, consequently connected to said socket or sockets. Said protection is particularly useful for example in household electric plants, wherein large use is also made of household machinery, and the like, inasmuch as said wiring device allows the feeding of one or more said household electric means, which as such are thus protected against overload, short-circuit and similar dangerous drawbacks deriving from eventual insufficient insulation of said appliances and machinery.

A further object of this invention is to provide a wiring device, whereof the magneto-thermical-differential and the socket or sockets do constitute an assembly which may be quickly and easily installed and is quickly connectable to the outside electricity distributing plant, thus considerably reducing the cost price and the charges for the workmanship.

The subject matter of this invention is represented in the attached sheet of drawings, of which:

FIGURE 3 represents a sectional view of said wiring device.

Figure 1:
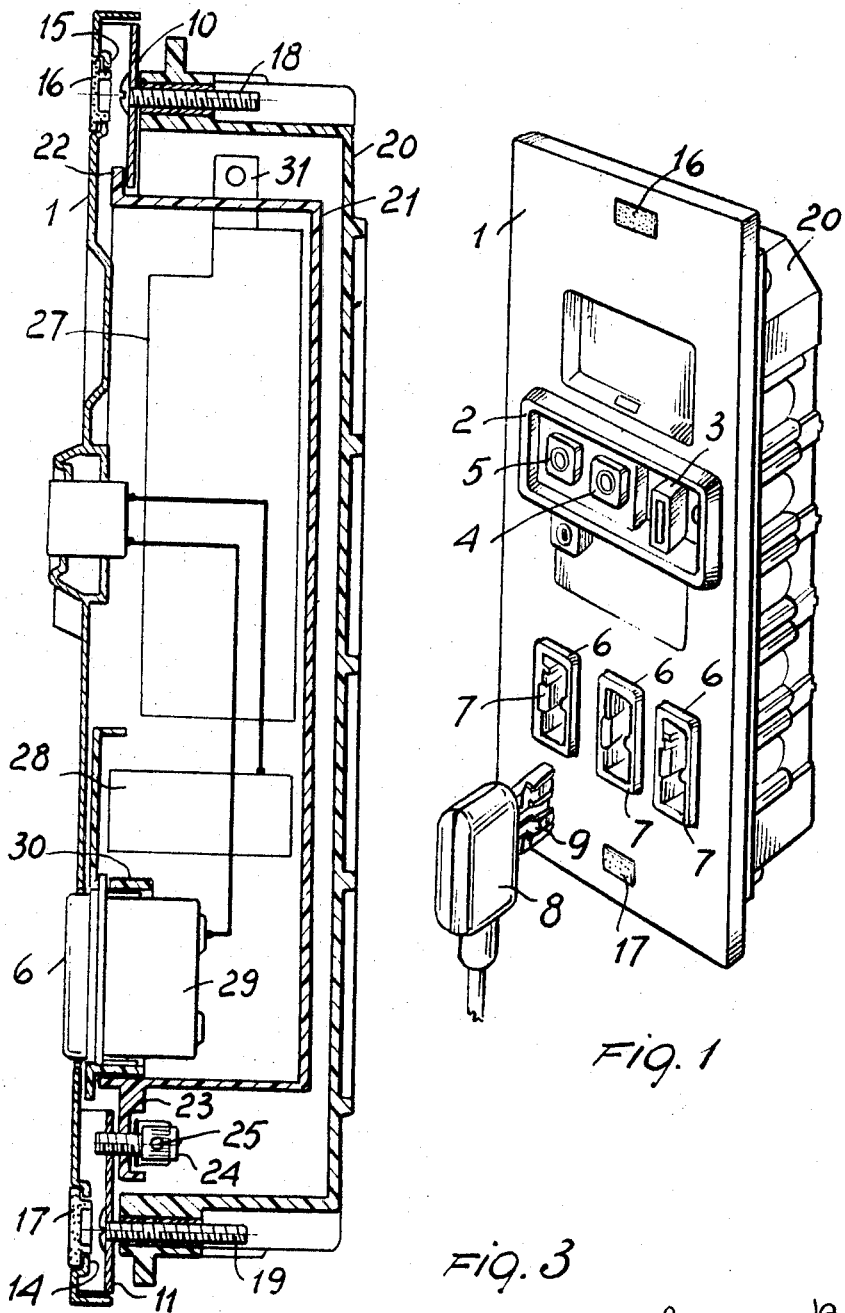
FIGURE 1 shows an exterior view of the wiring device.

As shown in the drawing the wiring device comprises a front plate 1 provided in its intermediate portion with a frame member 2 having holes from which the controlling and regulating means 3, 4 and 5 of a differential switch project. At the lower portion of said plate there are provided some windows 6 in which there are arranged the sockets 7. In the example of the attached drawing there are shown three such sockets, it being clear that their number may change in correspondence with the actual requirements.

FIGURE 1 illustrates security sockets of the kind adapted to be coupled with plugs 8, wherein the insertable member 9 of the plug 8 is key shaped, although any other shape for this member can of course be used.

Plate 1 is provided at its rear portion with two sheet steel supporting brackets 10 and 11 having elongated slits 12 and 13, respectively, which register with the windows 14 and 15, of the plate 1, which windows can be closed by means of plugs 16 and 17. Screws 18 and 19, respectively, are insertable through the windows 14 and 15, together with a suitable tool to drive them so that they will be disposed with their heads abutting lying against said brackets 10, 11 and overlying the holes 12 and 13 therein.

Figure 2:
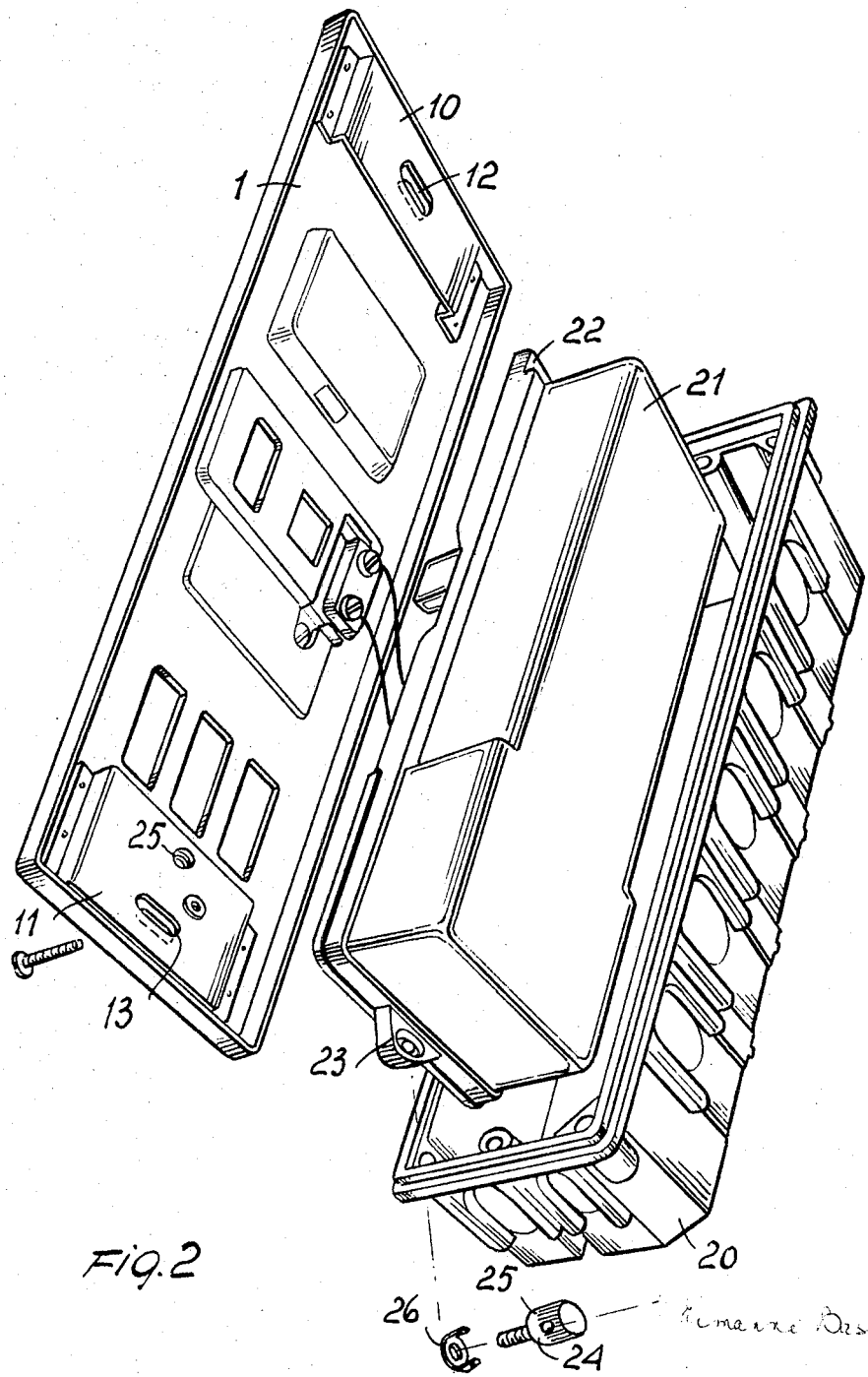
FIGURE 2 is an exposed view of the various components of the wiring device according to this invention.

Screws 18 and 19 serve to couple the plate 1 with an outer housing 20. In FIGURES 1 to 3 the housing 20 is of the kind to be encased into a wall; the same may but also be of the kind to set up at the exterior of said wall.

In the interior of the housing 20 there is disposed an insulating envelope 21 which shows at one of its end portions a projection 22 which is insertable underneath one of said brackets, e.g. bracket 10, while at the opposed end portion there is a bored lug 23, through which a screw 24 with its knurled head is threaded into a threaded hole 25 of bracket 11, thus providing for secure and rapid engagement of said internal envelope 21.

The head of screw 24 is provided with a throughgoing hole 25 and engages with a small stirring 26, also provided with bores, the whole permitting the passage of an engaging seal bearing means with the view to impede unauthorized opening of the wiring device in question.

In the interior of said envelope 21 there are enclosed the devices pertaining to the combination under discussion. Said devices have been represented on the drawings only in their external outline because they are of conventional kind. In particular there are shown the self-acting switches 27, 28 forming the differential circuit, and the devices 29 of the sockets.

The wiring devices 29 are lodged in respective seatings 30, which show encasing members corresponding with the same members of said wiring devices.

Two side-by-side disposed terminals 31 project from said internal envelope 21, only one being shown, and to these the electric leaders coming from the external electric distributing plant are connected, while the connection between the self-acting differential switch and the socket(s) has already been provided for at the prefabrication shop in the mounting step of the device.

As it may be understood from the hereinabove given explanation, the wiring device as per this invention makes it possible to set up a protecting switch together with sockets in a very simple, rapid and economical way for feeding and protecting one or more electric energy utilising appliances and machinery in household.

What I claim is:

1. A wiring device, comprising, in combination, an outer housing having a first open side; an inner housing of electrically insulating material received in said outer housing and having a second open side facing in the same direction as said first open side; a cover plate overlying both of said open sides and being provided with first and second aperture means respectively communicating with said second open side; connecting means connecting said cover plate with said inner and outer housing, respectively, for retaining said cover plate in position overlying both of said open sides; a differential circuit breaker mounted in said inner housing arranged to be connected to a source of electric energy and including actuating portions projecting from said first aperture means so as to be accessible to the fingers of an operator; and a plurality of electrical outlet devices arranged in said inner housing electrically connected with said circuit breaker so as to be controlled thereby, and being accessible through said second aperture means.

2. A wiring device as defined in claim 1; and further comprising holding means operatively associated with cover plate and said outlet devices for mounting the latter on the former in predetermined positions in which they are accessible through said second aperture means.

3. A wiring device as defined in claim 1, wherein said outer housing is adapted to be mounted recessed within a wall.

4. A wiring device as defined in claim 1, wherein said outer housing is adapted to be mounted on a wall exteriorly of the same.

5. A wiring device as defined in claim 1, said connecting means connecting said cover plate with said inner housing comprising antitampering means for preventing unauthorized disconnecting of said cover plate from said inner housing and tapering with the components located in the interior of said inner housing.

6. A wiring device as defined in claim 1, said circuit breaker comprising conductor means connecting said circuit breaker with said outlet devices.

References Cited

UNITED STATES PATENTS

| | | |
|---|---|---|
| 3,043,925 | 7/1962 | Wilson. |
| 3,054,023 | 9/1962 | Blecker et al. ____ 317—113 XR |
| 3,137,212 | 5/1964 | Rose _____ 317—99 XR |
| 3,256,479 | 6/1966 | Edwards _____ 317—99 XR |

LEWIS H. MYERS, *Primary Examiner.*

J. R. SCOTT, *Assistant Examiner.*

U.S. Cl. X.R.

317—112